Sept. 14, 1965      J. F. NELSON      3,205,546

ADJUSTABLE REMOVABLE MOLDING CLIP

Filed Aug. 28, 1963

INVENTOR.
John F Nelson
BY *Robert W. Beart*
ATT'Y

United States Patent Office
3,205,546
Patented Sept. 14, 1965

3,205,546
ADJUSTABLE REMOVABLE MOLDING CLIP
John F. Nelson, Des Plaines, Ill., assignor to Illinois Tool Works Inc., Chicago, Ill., a corporation of Delaware
Filed Aug. 28, 1963, Ser. No. 305,174
4 Claims. (Cl. 24—213)

The present invention relates to a novel fastening device which is adapted for securing together complementary opposed panel members or a channel-shaped member, such as a molding strip, and a panel member.

Various clips have heretofore been constructed for securing molding strips in place. Some of these clips have been useable with only a single size molding strip, while others have been devised to permit the adjustment of the clip according to the size of the molding strip. In either case, it is necessary to secure the clip to both the molding and a panel with which the molding is associated, and this is normally done by providing fastening elements or means on the molding clip. If the molding clip is made of two separate fastening means, it may be provided with adjustable removable features permitting proper positioning of the molding strip during application of the strip to its associated panel and replacement of either one of the fastening means as may become necessary through wear, damage, or improper application of the clip to the molding strip and panel. The present invention contemplates the use of separate and distinct, but related fastening means having adjustable and separating features, which fastening means are in the form of a stud and head member for securing, respectively, the panel and molding strip together.

One of the objects of the present invention is to provide a molding clip wherein a stud member is adjustable on a head member to permit the adjustment of a channel-shaped member in the form of a molding strip or the like.

Another object of the present invention is to provide for an adjustment of the molding strip after the head member engages the strip and the stud member is flexibly engaged within an apertured panel.

Another object of the present invention is to provide a molding clip wherein the head member of the clip permits adjustment of the molding, and the stud member associated with the head member also permits an adjustment which is approximately ⅛ or ¼ of the total adjustment of the molding strip.

A still further object of the present invention is the provision of a molding clip wherein the stud member is removably secured to the head member to permit replacement of either of the parts.

Another object of the present invention is the provision of a fastening device in the form of a spring clip or stud member which can be easily removed from the front side of an apertured panel by a simple tool, or the like.

Still another object of the present invention is the provision of a molding clip wherein the head and stud members can be easily and economically manufactured in two parts by stamping and bending the parts to conform to the shape desired.

Other objects and advantages of the present invention will become apparent from the following description and the accompanying drawings, wherein:

FIG. 5 is a cross sectional view of the stud member taken along the line 5—5 of FIG. 6 showing an engagement of opposite sides of the stud member by a simple tool, or the like;

Figure 1:
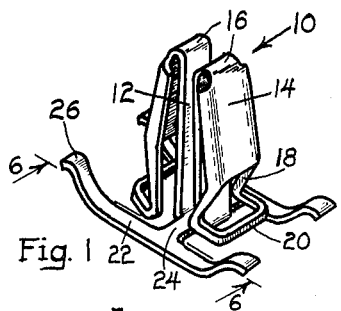
FIG. 1 is a perspective view of a stud member incorporating features of the present invention.
Figure 7:
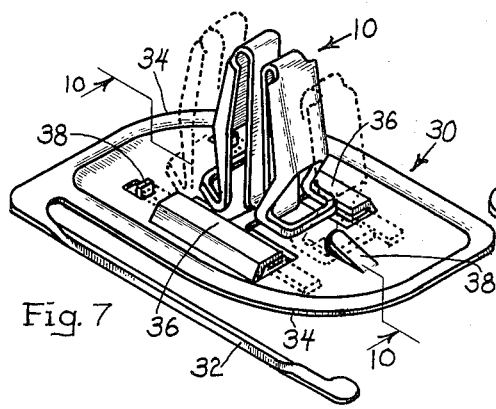
FIG. 7 is a perspective view of the stud and head members incorporating features of the present invention.
Figure 8:
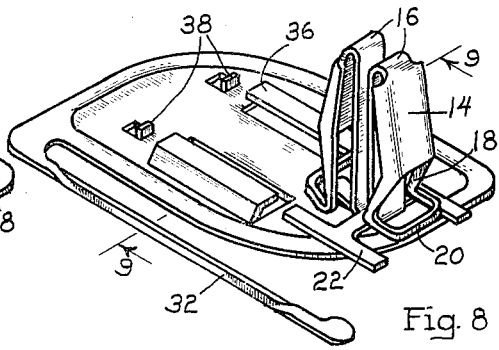
FIG. 8 is also a perspective view of the head and stud members wherein the head is shown as being removably detached from the stud member.
Figures 9, 10:
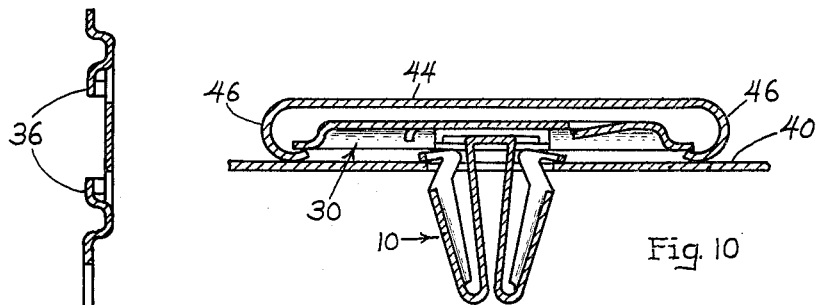
FIG. 9 is a cross sectional view of the head member taken generally along the line 9—9 of FIG. 8.
FIG. 10 is a cross sectional view of the head and stud members of the present invention as they are positioned within the molding strip and apertured panel.

Referring now more specifically to the drawings, wherein like parts are designated by the same numerals throughout the various figures, a spring clip or stud member 10 is shown in perspective in FIG. 1 of the drawings. This spring clip or stud member may be utilized for connecting together a plurality of complementary opposed panels as will presently become apparent, and is especially suitable for use with a head member 30 to provide a fastening device which is commonly known in the art as a molding clip. When used in its preferred form, the stud member 10 is associated with the head member 30 as shown in FIGS. 7–8 and 10 of the drawings. The stud member 10 is adapted to be applied to an apertured panel or workpiece 40 having an opening therethrough for mounting another workpiece such as a molding strip 44 which is secured in place by the head member 30. The molding strip may have a shape in accordance with various known constructions and is preferably provided with inturned opposite marginal flanges 46 as shown in FIG. 10 of the drawings for engagement with the head member of the molding clip in the manner described below. Both the head and stud members are formed from suitable sheet material such as sheet steel to provide strength and flexibility, but may be made of plastic or other similar material.

As best shown in FIG. 1 of the drawings, the stud member 10 is provided with opposed parallel elongated arms 22 having flexible tips 26 for attachment to either the head member of a molding clip or to an opposing panel. When used alone to secure complementary opposing panel members, the stud member arms 22 may be used as a head means for attachment to one panel member, and the spring arms 14 and finger portions 18 may be used, as will presently be described, to secure the other panel member. It is to be understood, however, that the stud member is preferably, though not limited for use, with a head member as shown in FIGS. 7–8 and 10 of the drawings.

Figure 4:
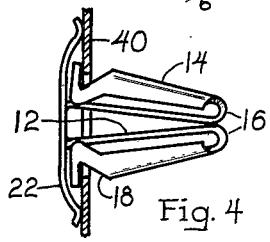
FIG. 4 is a side elevational view of the stud member, similar to FIG. 3, wherein the stud member is applied to a panel or workpiece.

The opposed parallel elongated arms 22 of the stud member are integrally joined together by a connecting means 24 extending therebetween. A pair of axially extending and inwardly inclined elongated legs 12 are integrally joined on oppoiste sides of the connecting means 24 and extend substantially normal to the arm portions 22. Spring arms 14 extend laterally from the elongated legs 12 and are joined thereto along relatively short entering end portions 16 of the longitudinal margins of the elongated legs and spring arms. This provides a relatively stiff connection between the spring arms and the elongated legs, which together form shank or stud means, and still enables the spring arms to flex inwardly relative to the elongated legs during application of the stud member to an apertured panel. The reversely bent spring arms 14 extend toward the arm portions 22 and are provided with hook-shaped finger portions 18 presenting shoulders which engage opposite sides of a panel as shown in FIG. 4, to prevent removal therefrom. Integrally associated with and connecting the finger portions of the spring arms is a deflecting means 20 having portions permitting deflection of the spring arms in the manner shown in FIGS. 5-6 to provide withdrawal of the stud member from the apertured panel. These deflecting means or portions 20 of the spring arms are positioned interjacent the complementary opposed panel members or between the molding strip and apertured panel as best shown in FIG. 10 to permit an associated tool to engage the deflecting means or portions and flex the spring arms inwardly to remove the stud member from the apertured panel.

Figure 2:
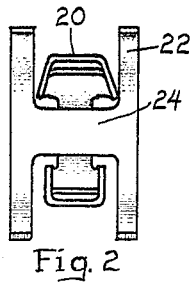
FIG. 2 is a bottom plan view of the stud member shown in FIG. 1.
Figure 3:
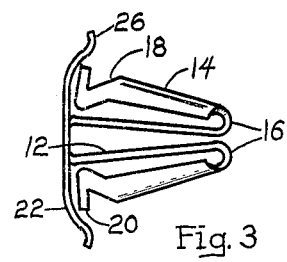
FIG. 3 is a side elevational view of the stud member shown in FIGS. 1 and 2.

FIG. 2 is a bottom plan view of the stud member showing the connecting means 24 extending between the opposed parallel arms 22. In FIGS. 3-4, the stud member is shown prior to and after insertion through a panel 40. It is to be obesrved that the spring arms 14 in FIG. 4 are slightly compressed as compared with FIG. 3 to permit the stud member to be secured within the apertured panel 40.

Figure 5:
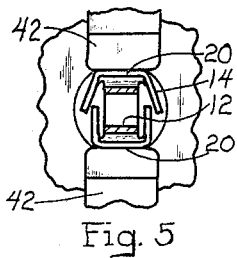
Figure 6:
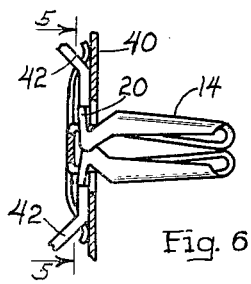
FIG. 6 is a side elevational view of the stud member applied to a panel aperture and just prior to removal therefrom.

Because of the shape and configuration of the finger portions 18 of the stud member, there will be permitted a slight axial movement of the stud member for ingress of a tool between the molding strip and panel member. This is shown in FIGS. 5-6 wherein a tool 42 contacts opposing spring arm deflecting portions 20 to flex them inwardly and permit removal of the stud member from the panel 40. The spring arms 14 are preferably provided with interfitting U-shaped portions each having a bight end portion and a pair of substantially parallel flange means extending therefrom as shown in FIG. 5 to permit a substantial amount of inward flexure of the spring arms. To accomplish this relative interfitting movement of the spring arms, one of the U-shaped portions of the spring arms may be deformed to a greater extent than the other U-shaped portion for complementary reception of the latter within the former. It will be evident that the removal of the stud member from the apertured panel 40 can also be accomplished when the stud member is associated with the head member 30 as shown in FIGS. 7-8, and it is also to be observed that a tool may contact a single spring arm deflecting portion and depress the same to permit rocking of the stud member for removal from the panel 40.

The head member 30 of the molding clip is provided with oppositely disposed peripheral work engaging bearing surfaces 34 and a spring arm 32 which is yieldably shiftable and adapted to engage the inturned flanges 46 of the molding strip to rotatably urge the peripheral bearing surfaces 34 into work engaging position. A description of the operation and features of such a head member is disclosed in re-issue Patent No. 23,876 to O. J. Poupitch dated September 21, 1954, the specific details of which form no part per se of the present invention. The head member as disclosed and described in that re-issue patent or any other head member for securing molding strips may, however, be provided with novel means to be described for releasably securing the stud member of the present invention to a head member. More specifically, the head means is provided with opposed parallel channel or track means 36 which are struck from the head member to provide for the slidable reception of the arms 22 of the stud member. This will permit a slight adjustment of the stud member on the head member when they are secured in the panel aperture, and yet will prevent relative movement of the members caused by vibratory forces since the flexible tips 26 will be held under compression by one surface of the channel or track means and compensate for such forces.

The head member 30 is also provided with opposed resilient tab means 38 which are struck from the head member adjacent the channel or track means and are separated by a distance greater than the length of the channel or track means 36 to prevent removal of the stud member unless the tabs are deflected in the plane of the head member. The tab means may be located in quadrature or other relationship with each other. When it is desired to remove the head and stud members from the apertured panel, the stud member may be axially withdrawn a slight distance to permit ingress by a tool means for removal of the stud member from the panel aperture. The head member may then be removed from the molding strip. If it should additionally become necessary to separate the parts because of wear, damage or the like, this may be accomplished by the deflection of one of the opposed tabs 38 in the plane of the head member to permit easy removal. It may in some instances, however, be feasible to remove the stud member without deflecting the tab portions by simply compressing the spring legs of the stud member and sliding the deflecting portions 20 over the opposed tabs 38. This will normally not be the case although the fastening device may be adapted for such a use, if desired.

Figure 11:
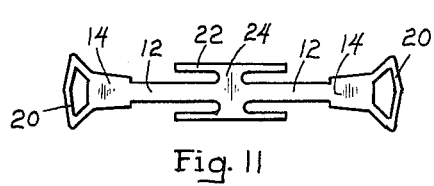
FIG. 11 shows the spring clip or stud member of FIGS. 1–6 as originally struck from sheet metal and prior to folding and bending.

The struck blank shown in FIG. 11 will be bent to the shape and configuration shown in FIG. 1. Because the tabs, channels or tracks, spring arms, etc. of the head member may also be struck from sheet material, it will be apparent that the two part fastening device is easy and economical to manufacture because of the small number of parts, and yet will provide adjustable and removable features in the fastening device.

While the preferred embodiments of the present invention have been shown and described herein, it is obvious that many structural details may be changed without departing from the spirit and scope of the appended claims.

The invention is claimed as follows:

1. A one piece spring clip adapted to be accepted in an apertured panel member and comprising head and shank means, said shank means having a pair of spaced elongated legs, each being provided with a reversely bent spring arm which is aligned with the corresponding leg and laterally spaced outwardly thereof, said spring arms each including a pair of substantially parallel flanges extending inwardly towards the axis of said shank means from opposite edges thereof, the flanges of each spring arm being spaced apart a distance greater than the largest transverse dimension of the respective elongated leg whereby the flanges of each spring arm are capable of being moved laterally inwardly of its elongated leg, shoulder means provided on said flanges of each spring arm for engaging a surface of said apertured panel opposite the surface engaged by said head, and means extending outwardly from each of said spring arms adapted to traverse the aperture in said panel and to engage the opposite surface of said panel and including portions disposed adjacent said surface engaged by said head and adapted to be engaged to move the spring arms toward one another and permit withdrawal of the clip from said apertured panel member.

2. A spring clip as defined in claim 1 wherein portions of the substantially parallel flanges at the shoulder means of one spring arm are spaced apart a distance greater than the corresponding portions of the flanges of the other spring arm to permit movement of one spring arm within the other when said spring arms are moved towards one another.

3. A spring clip as defined in claim 1 wherein said shoulder means are associated with said means extending outwardly from said spring arms to traverse the aperture and include portions inclined inwardly towards the axis of said shank means, and wherein the portions disposed adjacent the surface engaged by the head include transverse connecting means interconnecting said inclined portions and adapted to overlie the opposite surface of said panel from the surface engaged by said shoulder means whereby inward movement of said transverse connecting means toward the axis of the shank will deflect said spring arms and permit withdrawal of the clip from said apertured panel.

4. A one piece, spring sheet metal fastening device for application to an apertured work structure comprising a head section for overlying one side of said work structure and stud means extending generally axially from said head section and insertable into said work structure aperture, said stud means including a pair of leg portions each extending generally axially from its junction with said head section and being reversely bent at its extremity to form a spring arm extending upwardly toward said head, laterally projecting flanges extending along longitudinal edges of each spring arm in the direction of the leg portion and the other spring arm, said flanges presenting shoulders facing generally toward said head section for engaging a surface of a work structure oppositely from said head section, means extending integrally from said flanges and adjacent said shoulders and adapted to traverse the aperture, and means for connecting the extensions of each of the flanges of said spring arms, said connecting means being adapted to engage the surface of the work structure engaged by said head section, whereby movement of said connecting means toward the axis of each of said leg portions will deflect said flanges and their associated shoulders inwardly to permit withdrawal of the clip from said apertured work structure.

References Cited by the Examiner

UNITED STATES PATENTS

| | | | |
|---|---|---|---|
| 1,959,096 | 5/34 | Fernberg | 24—73 |
| 2,246,720 | 6/41 | Churchill | 24—73 X |
| 2,542,375 | 2/51 | Torresen | 151—41.75 X |
| 2,598,776 | 6/52 | Flora | 24—73 X |
| 2,695,435 | 11/54 | Bedford | 24—73 |
| 2,961,723 | 11/60 | Hamman | 24—73 |
| 3,039,160 | 6/62 | Scott | 24—73 |

WILLIAM FELDMAN, *Primary Examiner.*

DONLEY J. STOCKING, *Examiner.*